W. H. REAGAN, Jr.
TAKE-UP FOR BUSHINGS.
APPLICATION FILED SEPT. 13, 1916.
1,220,784.
Patented Mar. 27, 1917.
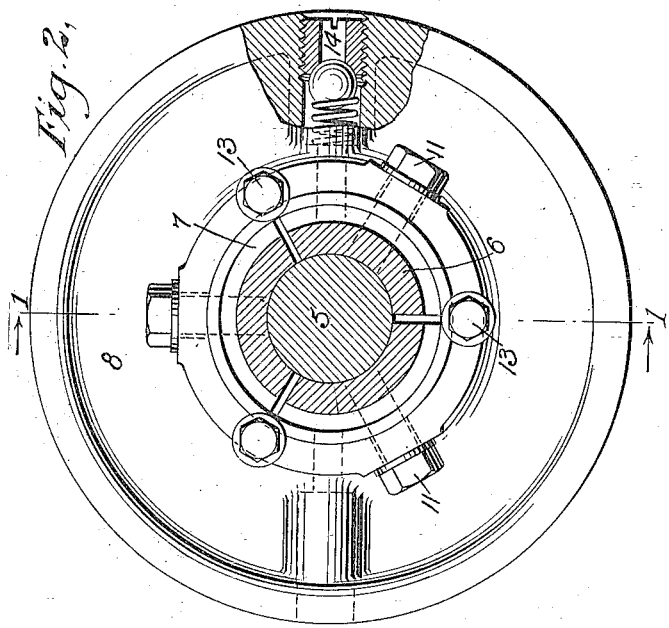
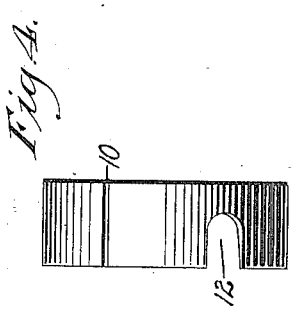
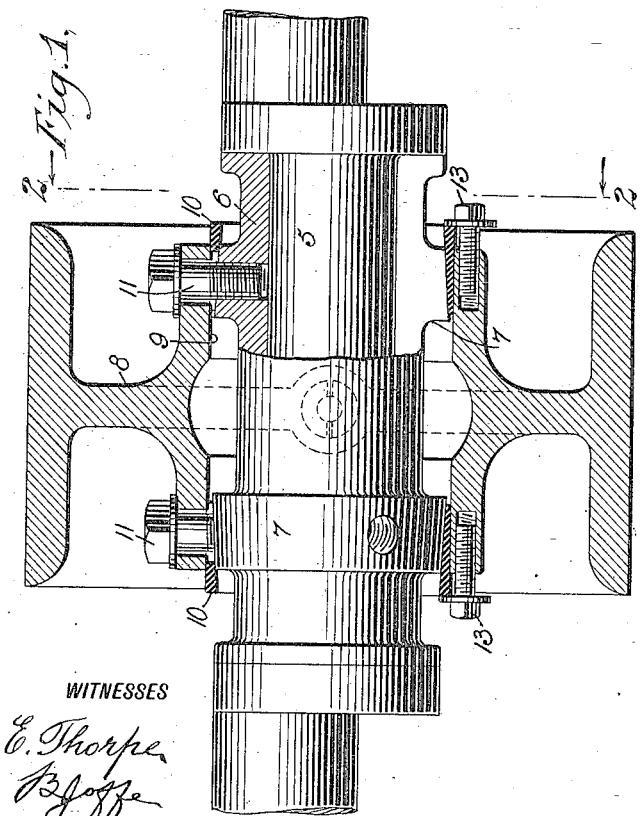
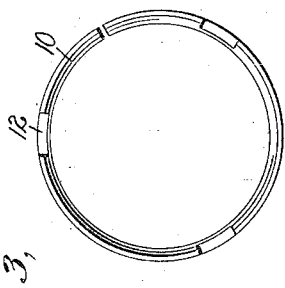
WITNESSES
E. Thorpe
B. Joffe
INVENTOR
W. H. Reagan Jr.
BY
ATTORNEYS

UNITED STATES PATENT OFFICE.

WILLIAM HENRY REAGAN, JR., OF MIAMI, ARIZONA.

TAKE-UP FOR BUSHINGS.

1,220,784. Specification of Letters Patent. Patented Mar. 27, 1917.

Application filed September 13, 1916. Serial No. 119,805.

*To all whom it may concern:*

Be it known that I, WILLIAM HENRY REAGAN, Jr., a citizen of the United States, and a resident of Miami, in the county of Gila and State of Arizona, have invented a new and Improved Take-Up for Bushings, of which the following is a full, clear, and exact description.

My invention relates to take-ups for bushings and has reference more particularly to take-ups for bushings used for head motions.

An object of the invention is to provide a simple and inexpensive arrangement whereby the wear caused by motion can be easily and quickly taken up without disturbing the throw and without disturbing the alinement of the various machine elements associated with the bushing.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a vertical section on line 1—1, Fig. 2, through a head motion the bushing of which is provided with an embodiment of my invention;

Fig. 2 is a section on line 2—2, Fig. 1, the head motion of the take-up ring being shown in elevation;

Fig. 3 is an elevation of the split, tapering ring used for the take-up; and

Fig. 4 is a side elevation thereof.

Referring to the drawings, 5 is a crank shaft, the bearing for which is formed by a bushing 6 formed of a plurality of sections. The bushing has a pair of annular shoulders 7 spaced from each other and tapering outwardly, that is, toward the adjacent ends of the bushing.

A pulley 8 fits over the shoulder 7. The bore 9 of the pulley is cylindrical and of a diameter larger than the larger diameter of the shoulder 7. Interposed between the bore 9 and each shoulder 7 is a split tapering ring 10, the ring being tapered on its inner surface and corresponding with the taper of the shoulder 7 of the bushing 6. The sections of the bushing 6 are retained in position by means of cap screws 11 which pass through the hub of the pulley into the shoulders 7 of the bushing. The split rings have end slots or notches 12 providing clearance for the set screws. The split rings 10 are retained in position by cap screws 13 threaded into the hub of the pulley.

The hub of the pulley has a valve-closing plug 14 through which lubricant may be introduced into the hub between the shoulders 7 of the bushing. It will be noted that the hub is closed at the ends by the split rings 10, which prevents the lubricant from escaping from the hub, although there is not a tight fit between the collars and the hub proper.

By providing the tapering split rings 10 between the shoulders 7 of the bushing and the hub of the pulley, it is possible to take up wear caused by the motion of the various parts.

I claim:

1. In combination with the hub of a revoluble member, a split bushing having conical shoulders within the hub, rings interposed between the shoulders and the hub, and means for locking the rings and bushing to the hub.

2. In combination with the hub of a revoluble member, a split bushing having conical shoulders within the hub, tapering rings between the shoulders and the hub, means for locking the bushing to the hub, and means for locking the rings to the hub.

3. In combination with the hub of a revoluble member, a split bushing having conical shoulders within the hub, an annular tapering split ring between each shoulder and the hub, adjustable locking means for securing the bushing to the hub, and adjustable locking means for securing the rings to the hub.

4. In combination with the hub of a revoluble member, which hub has a cylindrical bore, a split bushing having conical shoulders within the bore, an annular tapering split ring interposed between each shoulder and the hub, cap screws securing the shoulders to the hub, said rings having notches to clear the screws, and cap screws within the hub engaging the rings for locking said rings between the hub and the shoulders.

5. In combination with the hub of a revoluble member, a split bushing in the hub, contractible tapering rings interposed between the bushing and the hub, said bushing and hub having surfaces contacting with the rings and means for locking the rings and bushing to the hub.

WILLIAM HENRY REAGAN, Jr.

Copies of this patent may be obtained for five cents each, by addressing the "Commissioner of Patents, Washington, D. C."